(12) United States Patent
Cencula

(10) Patent No.: US 11,731,698 B2
(45) Date of Patent: Aug. 22, 2023

(54) SOLAR VEHICLE NAVIGATION

(71) Applicant: Liquid Robotics, Inc., Sunnyvale, CA (US)

(72) Inventor: Christopher David Cencula, Roseville, CA (US)

(73) Assignee: Liquid Robotics, Inc., Sunnyvale, CA (US)

( * ) Notice: Subject to any disclaimer, the term of this patent is extended or adjusted under 35 U.S.C. 154(b) by 339 days.

(21) Appl. No.: 16/849,844

(22) Filed: Apr. 15, 2020

(65) Prior Publication Data

US 2021/0323605 A1 Oct. 21, 2021

(51) Int. Cl.
*B62D 15/02* (2006.01)
*G01C 21/36* (2006.01)
*B60W 60/00* (2020.01)

(52) U.S. Cl.
CPC ....... *B62D 15/024* (2013.01); *B60W 60/0011* (2020.02); *B60W 60/0025* (2020.02); *B62D 15/025* (2013.01); *G01C 21/3605* (2013.01)

(58) Field of Classification Search
None
See application file for complete search history.

(56) References Cited

U.S. PATENT DOCUMENTS

| | | | |
|---|---|---|---|
| 9,959,771 B1 * | 5/2018 | Carlson | G08G 5/0039 |
| 10,301,022 B1 * | 5/2019 | Scott | B60L 53/66 |
| 11,453,274 B2 * | 9/2022 | Costa | B60J 3/04 |
| 2013/0018532 A1 * | 1/2013 | Segal | B64C 39/024 |
| | | | 701/3 |
| 2019/0248243 A1 * | 8/2019 | Gaither | B60L 8/003 |

FOREIGN PATENT DOCUMENTS

| | | | | |
|---|---|---|---|---|
| CN | 102445213 A | * | 5/2012 | ......... G01C 21/3461 |
| CN | 204576280 | * | 8/2015 | |
| GB | 2511731 A | * | 9/2014 | ............. B63H 21/17 |

* cited by examiner

*Primary Examiner* — Tamara L Weber
(74) *Attorney, Agent, or Firm* — Alleman Hall Creasman & Tuttle LLP

(57) ABSTRACT

Navigation of a solar vehicle is provided by obtaining a target geographic destination for the vehicle having one or more photovoltaic solar arrays; obtaining configuration data defining a target solar vector relative to a reference frame of the vehicle; identifying a current geographic positioning of the vehicle via a geo-positioning system of the vehicle, including a current geographic location and a current geographic orientation of the vehicle; identifying a current solar vector relative to the reference frame of the vehicle; and during at least a portion of a solar day, outputting a steering command for the vehicle for an indirect path from the current geographic location toward the target geographic destination that is based, at least in part, on a comparison of the current solar vector to the target solar vector. The steering command can be presented to a human operator or programmatically implemented by an autonomous or semi-autonomous vehicle.

20 Claims, 5 Drawing Sheets

SOLAR VEHICLE NAVIGATION

FIELD

An invention of the present disclosure relates generally to navigation of solar vehicles.

BACKGROUND

Solar energy can be harvested by solar devices as electrical energy or heat energy. For example, photovoltaic solar arrays convert solar energy into electricity for a variety of uses. A potential disadvantage of photovoltaic solar arrays is that shadows cast upon the solar array by physical objects, also referred to as shading, can result in a disproportionately large reduction in electrical energy that is generated by the solar array as compared to a relative size of the shadowed region of the solar array. As an illustrative example, shading of an individual photovoltaic cell among a thirty-six cell solar array can result in a reduction of over 75% of the electrical power output by the solar array.

SUMMARY

According to an example, an autonomous or semi-autonomous solar vehicle comprises a vehicle body, a steering system mounted to or incorporated within the vehicle body operable to steer the vehicle, and an electronic system mounted to the vehicle body. The electronic system includes one or more photovoltaic solar arrays, a geo-positioning system, and a control system. The control system is configured to: obtain a target geographic destination for the vehicle; obtain configuration data defining a target solar vector relative to a reference frame of the vehicle; identify a current geographic positioning of the vehicle via the geo-positioning system, including a current geographic location and a current geographic orientation of the vehicle; identify a current solar vector relative to the reference frame of the vehicle; and during at least a portion of a solar day, operate the steering system to steer the vehicle from the current geographic location toward the target geographic destination along an indirect path that is based, at least in part, on a comparison of the current solar vector to the target solar vector. The indirect path can increase a total amount of electrical energy generated by the one or more photovoltaic solar arrays relative to a direct path between the current geographic location and the target geographic destination during at least the portion of the solar day.

According to another example, a computing system comprises a data storage device having instructions stored thereon executable by one or more computing devices to: obtain a target geographic destination for a vehicle having one or more photovoltaic solar arrays; obtain configuration data defining a target solar vector relative to a reference frame of the vehicle; identify a current geographic positioning of the vehicle via a geo-positioning system of the vehicle, including a current geographic location and a current geographic orientation of the vehicle; identify a current solar vector relative to the reference frame of the vehicle; and during at least a portion of a solar day, output a steering command for the vehicle for an indirect path from the current geographic location toward the target geographic destination that is based, at least in part, on a comparison of the current solar vector to the target solar vector. The steering command can be presented to a human operator or programmatically implemented within the context of the vehicle being an autonomous or semi-autonomous vehicle. The indirect path can increase a total amount of electrical energy generated by the one or more photovoltaic solar arrays relative to a direct path between the current geographic location and the target geographic destination during at least the portion of the solar day.

According to another example, a method performed by a computing system of one or more computing devices comprises: obtaining a target geographic destination for a vehicle having one or more photovoltaic solar arrays; obtaining configuration data defining a target solar vector relative to a reference frame of the vehicle; identifying a current geographic positioning of the vehicle via a geo-positioning system of the vehicle, including a current geographic location and a current geographic orientation of the vehicle; identifying a current solar vector relative to the reference frame of the vehicle; and during at least a portion of a solar day, outputting a steering command for the vehicle for an indirect path from the current geographic location toward the target geographic destination that is based, at least in part, on a comparison of the current solar vector to the target solar vector. The steering command can be presented to a human operator or programmatically implemented within the context of the vehicle being an autonomous or semi-autonomous vehicle. The indirect path can increase a total amount of electrical energy generated by the one or more photovoltaic solar arrays relative to a direct path between the current geographic location and the target geographic destination during at least the portion of the solar day.

The features and techniques discussed in this summary can be provided independently in various examples or may be combined in yet other examples, further details of which are described with reference to the following description and drawings.

DETAILED DESCRIPTION

Solar vehicles can utilize one or more photovoltaic solar arrays located on-board the vehicle to harvest solar energy. Some vehicles include physical components that can cast shadows upon the solar array at certain orientations relative to the sun. A solar vehicle in the form of a marine vessel, for example, may include antennas, masts, or other components that cast shadows onto the solar array within a range of solar vectors (i.e., when the vehicle heading is within a range of headings for a given time of day and location). As previously discussed, a potential disadvantage of photovoltaic solar arrays is that shadows cast upon the solar array, also referred to as shading, can result in a disproportionately large reduction in electrical energy that is generated by the solar array as compared to a relative size of the shadowed region.

The present disclosure provides examples that may address the above issues associated with shading of solar arrays of solar vehicles. According to an example, navigation of a solar vehicle is provided by generating a steering command for the vehicle from a current geographic location toward a target geographic destination that is based, at least in part, on a comparison of a current solar vector to a target solar vector. The target solar vector can be a range that is defined by configuration data that is specific for the vehicle. The steering command can be presented to a human operator or programmatically implemented within the context of the vehicle being an autonomous or semi-autonomous vehicle. The path of travel, including indirect paths of travel provided by the steering command can increase a total amount of electrical energy generated by the photovoltaic solar array relative to a direct path between the current geographic location and the target geographic destination during at least a portion of a solar day by reducing or eliminating shading of the vehicle's solar arrays. Greater solar yield can provide power for higher-power payloads on-board the vehicle and allow for a quicker recovery of vehicle power storage levels during periods of direct sunlight.

Figure 1:
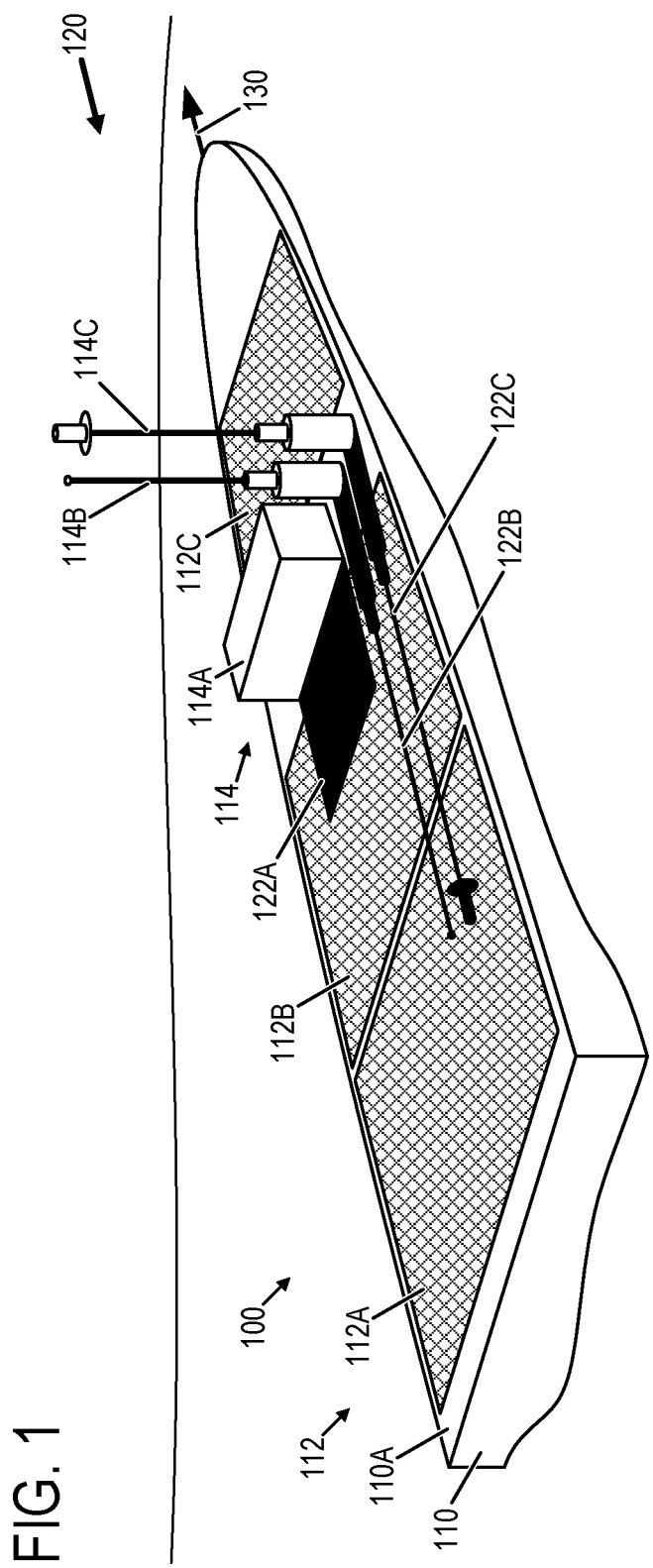
FIG. 1 depicts an example solar vehicle.

FIG. 1 shows an example solar vehicle 100. Solar vehicle 100 includes a vehicle body 110. In this example, solar vehicle 100 takes the form of a watercraft in which vehicle body 110 forms a hull. However, solar vehicle 100 can take other suitable forms, including an aeronautical vehicle, a land vehicle, or another type of watercraft. Furthermore, in this example, solar vehicle 100 takes the form of an autonomous or semi-autonomous solar vehicle that can receive commands from a remote computing system via a wireless data link. However, the techniques disclosed herein can be applied to solar vehicles that are actively controlled by human operators.

Solar vehicle 100 includes a set of one or more photovoltaic solar arrays 112 mounted to vehicle body 110, indicated in this example at 112A, 112B, 112C, etc. In an example, photovoltaic solar arrays 112 are mounted to vehicle body 110 at a fixed orientation. However, the techniques disclosed herein can be used with solar vehicles that include moveable solar arrays. While the examples described herein seek to reduce or eliminate shading of photovoltaic solar arrays, it will be understood that the disclosed techniques can be applied to solar vehicles having different types of solar devices, including solar heating devices or solar arrays that do not rely on photovoltaics.

Solar vehicle 100 further includes one or more physical components 114 mounted to or forming part of vehicle body 110, indicated in this example at 114A, 114B, 114C, etc. In the example of FIG. 1, physical component 114A takes the form of an electronics enclosure, and physical components 114B and 114C take the form of communications antennas that project upward from an upper surface 110A of vehicle body 110.

Within FIG. 1, solar energy 120 in the form of solar radiation from the sun illuminates or otherwise impinges upon vehicle 100. In this example, solar energy 120 has a solar vector (i.e., a primary solar vector of the sun) that results in physical components 114A, 114B, and 114C casting respective shadows 122A, 122B, and 122C upon photovoltaic solar arrays 112A and 112B. These shadows cast upon solar arrays 112A and 112B have the potential to significantly reduce electrical energy generated by the solar arrays from solar energy 120 due to shading. Within FIG. 1, a reference frame of the vehicle is defined by a reference vector 130 having an origin at solar vehicle 100 and pointing along a longitudinal axis of the vehicle in a primary direction of travel. Solar vectors can be defined in relation to reference vector 130 as an example reference frame of solar vehicle 100.

Figure 2:
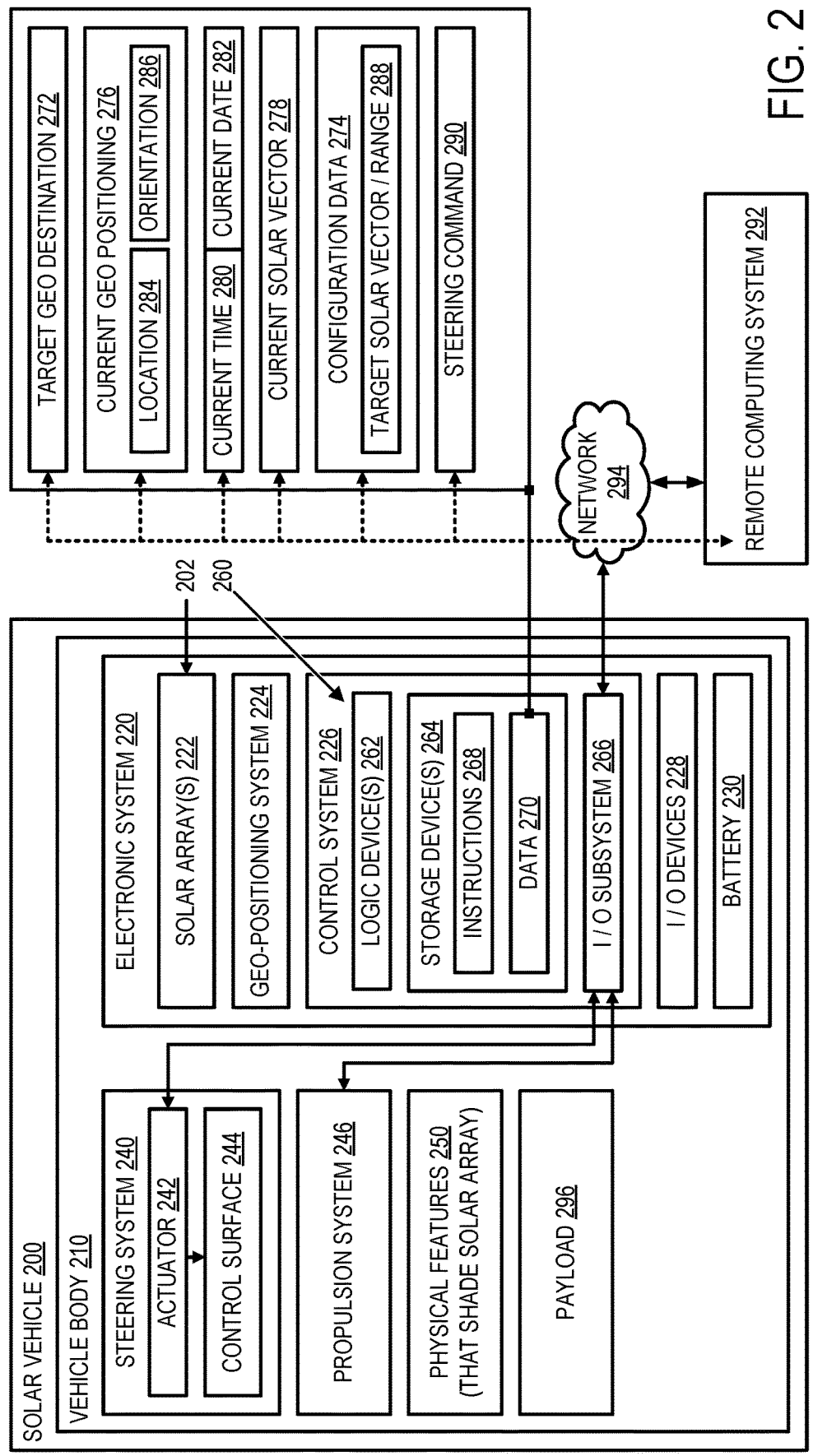
FIG. 2 schematically depicts an example technological environment within which a solar vehicle can be operated.

FIG. 2 schematically depicts an example technological environment within which a solar vehicle 200 can be operated. Solar vehicle 100 of FIG. 1 is an example of solar vehicle 200. However, solar vehicle 200 can take other suitable forms including a watercraft, an aeronautical vehicle, a land vehicle, etc. Solar vehicle 200 includes a vehicle body 210 having a form that is suitable for the type of vehicle. For example, a vehicle body of an aeronautical vehicle can include an airframe having one or more airfoil structures.

Solar vehicle 200 includes an electronic system 220 mounted to vehicle body 210. Electronic system 220 can include one or more photovoltaic solar arrays 222 that generate or otherwise convert solar energy 202 into electrical energy, a geo-positioning system 224 that measures a geographic positioning of the vehicle, a control system 226, one or more input and/or output devices 228, and a battery 230 for storing electrical energy (e.g., generated or otherwise converted by the one or more solar arrays 222) on-board the vehicle. It will be understood that a solar vehicle, such as solar vehicle 200, need not be powered exclusively by solar energy. Thus, a solar vehicle can obtain a portion of the total energy utilized by the vehicle from solar energy, while utilizing another energy source to achieve the total energy utilized by the vehicle.

Solar vehicle 200 can include a steering system 240 mounted to or incorporated within vehicle body 210 that is operable to steer the vehicle. In an example, steering system 240 includes one or more control surfaces, an example of which is depicted schematically at 244. In examples where solar vehicle 200 takes the form of a watercraft or an aeronautical vehicle, examples of control surface 244 include a rudder, aileron, elevator flap, rotor, etc. In examples where solar vehicle 200 takes the form of a land vehicle, examples of control surface 244 include a wheel, tire, tread, etc. Control surfaces of steering system 240 can be manipulated by one or more actuators to steer the vehicle, an example of which is depicted schematically at 242 with respect to control surface 244. Actuator 242 can be controlled electronically via electronic system 220 or manually controlled, depending on implementation.

Solar vehicle 200 can include a propulsion system 246 mounted to the vehicle body operable to propel the vehicle. Propulsion system 246 can be used to steer the vehicle in some vehicle configurations. In these examples, the steering system of the vehicle additionally includes the propulsion system. Examples of propulsion system 246 include one or more of an air or water jet, turbine, propeller, rotor, sail, wave power device, etc. in the case of a watercraft or aeronautical vehicle, or one or more of a wheel, tread, etc. powered by an electric motor, fuel combusting engine, or passively by wind or wave energy. Propulsion system 246 can be controlled electronically via electronic system 220 in at least some examples, and can consume electrical energy from battery 230.

As an example, a propulsion system of solar vehicle 100 of FIG. 1 can include two propulsion system components in which a first propulsion system component includes a submersible wave power device that converts wave power into forward propulsion, and a second propulsion system component that includes an electric thruster that can provide steering in addition to propulsion, and that receives its power from the photovoltaic solar arrays and/or battery on-board the vehicle. An example of this type of solar vehicle is WAVE GLIDER™ by LIQUID ROBOTICS™.

Solar vehicle 200 further includes one or more physical components 250 mounted to or forming part of vehicle body 210 that are capable of shading at least a portion of the one or more photovoltaic solar arrays 222 within a shading solar vector range. An example shading solar vector range is described in further detail with reference to FIG. 5. In at least some examples, solar vehicle 200 can include a payload 296, which can include cargo, passengers, etc. Payload 296 is capable of shading at least a portion of the one or more photovoltaic solar arrays 222 in at least some examples.

Control system 226 can include or take the form of a computing system 260 of one or more computing devices. Control system 226 includes one or more logic devices 262, one or more data storage devices 264, and an input/output subsystem 266 that is communicatively coupled to one or more input/output devices 228. In an example, the one or more data storage devices 264 include executable instructions 268 and other data 270 stored thereon that are executable by the one or more logic devices 262 to perform the methods and operations described herein, including method 300 of FIG. 3.

Examples of data 270 are depicted in FIG. 2 as including a target geographic destination 272 for the vehicle, configuration data 274 for the vehicle, a current geographic positioning 276 of the vehicle, a current solar vector 278 relative to the vehicle, a current time 280 and a current date 282 generated by an on-board clock or received timing signal, among other suitable data. Current geographic positioning 276 includes a current geographic location 284 and a current geographic orientation 286 of the vehicle as measured, for example, by geo-positioning system 224. Geo-positioning system 224 may support any suitable geo-positioning technology, and can communicate with satellite and terrestrial basestations to measure a current geographic location of the solar vehicle. Geographic orientation of the solar vehicle may be measured via an orientation sensor (e.g., a compass) of geo-positioning system 224. Configuration data 274 can define a target solar vector and/or a target solar vector range 288 that resides outside of the shading solar vector range of the vehicle. Target solar vectors are described in further detail with reference to FIGS. 3-5. Data 270 can further include a steering command 290 for steering solar vehicle 200 via steering system 240 and/or propulsion system 246. Control system 226 can communicate using input/output subsystem 266 with one or more remote devices such as remote computing system 292 via a wired or wireless data link established over network 294. As an example, control system 226 can exchange data with remote computing system 292, including sending or receiving any of various forms of data 270.

Figure 3:
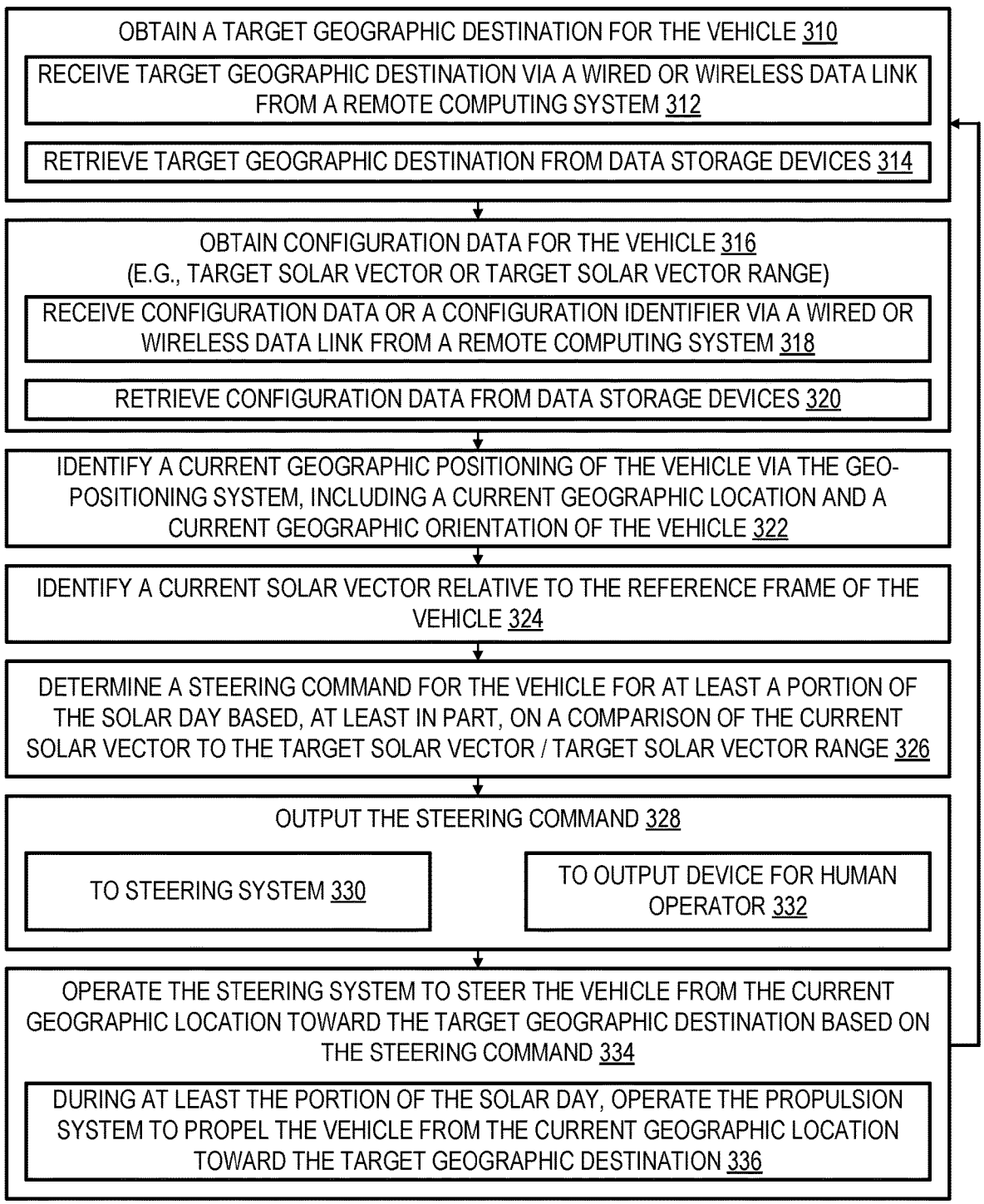
FIG. 3 is a flow diagram depicting an example method for operating a solar vehicle.

FIG. 3 shows a flow diagram depicting an example method 300 for operating a solar vehicle, such as the example solar vehicle 200 of FIG. 2. Method 300 can be performed to steer the solar vehicle along a path of travel that is based, at least in part, on a comparison of a current solar vector and a target solar vector or target solar vector range for the vehicle. This path of travel seeks to reduce or eliminate shading of one or more photovoltaic solar arrays of the vehicle during at least a portion of the solar day, thereby increasing or maximizing a total amount of electrical energy generated by the one or more of photovoltaic solar arrays on-board the vehicle. Aspects of method 300 can be performed by a control system (e.g., 226) located on-board the solar vehicle, off-board the vehicle by a remote computing system (e.g., 292), or by a combination of the control system located on-board the solar vehicle and a remote computing system.

At 310, the method includes obtaining a target geographic destination for the vehicle. As an example, the target geographic destination can be represented by a set of geographic coordinates that include longitude, latitude, and/or altitude values. The target geographic destination can be user defined, and may be received via a user input device located on-board the solar vehicle or at a remote computing system.

In at least some examples, the target geographic destination is obtained at 310 by receiving the target geographic destination via a wired or wireless data link from a remote computing system at 312, such as remote computing system 292 of FIG. 2. In an example, the target geographic destination can be received from the remote computing system via a wired data link as part of an initiation or maintenance process performed prior to launch or re-launch of the vehicle. In another example, the target geographic destination can be received from the remote computing system via a wireless data link before launch of the vehicle or during an existing operation of the vehicle, such as to change or update an existing geographic destination with the target geographic destination.

Upon receiving the target geographic destination from a local user input device or from a remote computing system, the target geographic destination can be stored as data within one or more data storage devices of the control system (e.g., 264 of FIG. 2), from which the target geographic destination can be obtained at 310 by the control system retrieving the target geographic destination from the one or more storage devices at 314.

In at least some examples, the target geographic destination is one of a plurality of waypoints that collectively define a travel route. Each waypoint of the travel route may be represented by a corresponding set of geographic coordinates that include, as an example, longitude, latitude, and/or altitude values. The plurality of waypoints of the travel route can be organized in an ordered sequence and can be associated with a respective sequence identifier or have an associated order within a data set that represents the travel route. Operation 310 can be performed with respect to each waypoint of the travel route to obtain that waypoint as similarly described with respect to the target geographic destination. For example, the travel route and its various waypoints can be user defined, and may be received via a user input device located on-board the solar vehicle or at a remote computing system. The travel route and its various waypoints can be received via a wired or wireless data link at 312. A data set representing the travel route and including the plurality of waypoints can be stored within one or more data storage devices of the control system (e.g., 264 of FIG. 2), from which the plurality of waypoints can be obtained by the control system retrieving the waypoints from the one or more storage devices at 314.

At 316, the method includes obtaining configuration data for the vehicle. In an example, the configuration data obtained at 316 defines one or more target solar vectors relative to a reference frame of the vehicle. Two or more target solar vectors can collectively represent boundaries of a target solar vector range defined by the configuration data. Each target solar vector can be represented relative to the reference frame of the vehicle by a vector in two dimensions (e.g., within a horizon plane or altitude plane) or in three dimensions (e.g., within both the horizon plane and the altitude plane orthogonal to the horizon plane).

In at least some examples, the configuration data obtained at 316 can form part of program instructions (e.g., instructions 268 of FIG. 2) executed by the control system. In these examples, the configuration data can be referred to as being hardcoded into program instructions of the control system, such as where the program instructions are specifically configured for the particular solar vehicle configuration. However, in other examples, the program instructions can be flexibly configured to support a variety of different solar vehicle configurations, each being associated with a respective set of configuration data. Accordingly, in at least some examples, the configuration data for the vehicle can be obtained at 316 by receiving the configuration data or a configuration data identifier via a wired or wireless data link from a remote computing system at 318, such as remote computing system 292 of FIG. 2. In an example, the configuration data or configuration data identifier can be received from the remote computing system via a wired data link as part of an initiation or maintenance process performed prior to launch or re-launch of the vehicle. In another example, the configuration data or configuration data identifier can be received from the remote computing system via a wireless data link before launch of the vehicle or during an existing operation of the vehicle. Upon receiving the configuration data or configuration data identifier from the remote computing system, the configuration data or configuration data identifier can be stored as data within one or more storage devices of the control system (e.g., 226 of FIG. 2). In at least examples, the configuration data obtained at 316 is one of a plurality of configuration data sets stored on the one or more data storage devices of the control system in which each configuration data set is associated with a respective configuration identifier. In these examples, configuration data retrieved from the one or more data storage devices at 320 can be identified among the plurality of configuration data sets as being associated with the configuration identifier received from the remote computing system.

At 322, the method includes identifying a current geographic positioning of the vehicle via a geo-positioning system of the vehicle, including a current geographic location and a current geographic orientation of the vehicle. In an example, the geo-positioning system provides measurements of the current geographic location as geographic coordinates that include longitude, latitude, and/or altitude values; and the current geographic orientation as a heading vector in two or three dimensions. In at least some examples, the geographic positioning of the vehicle can be represented by six degree-of-freedom (6DOF) values (e.g., X, Y, Z, roll, pitch, yaw).

At 324, the method includes identifying a current solar vector relative to the reference frame of the vehicle. The current solar vector identified at 324 can be represented relative to the reference frame of the vehicle by a vector in two dimensions (e.g., within a horizon plane or an altitude plane) or in three dimensions (e.g., within both the horizon plane and the altitude plane orthogonal to the horizon plane).

In an example, the current solar vector is identified based on the current geographic location of the vehicle, the current geographic orientation of the vehicle, a current time of day, and a current date. The current geographic location of the vehicle together with the current time of day and current date can be used to determine the current positioning of the sun relative to the geographic location of the vehicle. In an example, a look-up table, data map, or other suitable data set or service can be used to identify the current positioning of the sun based on time, date, and geographic position. The current orientation of the vehicle can be used to identify the current solar vector relative to the reference frame of the vehicle based on the current positioning of the sun.

Alternatively or additionally, the current solar vector can be identified relative to the reference frame of the vehicle via one or more optical sensors located on-board the vehicle. An optical sensor is an example of input/output devices 228 of FIG. 2. As an example, an optical sensor on-board the vehicle includes a camera that is used to visually observe the location of the sun within a field of view of the optical sensor, and the control system can translate the location of the sun within the field of view to a current solar vector based on a pre-established relationship between the field of view of the optical sensor and the vehicle reference frame. In at least some examples, an image of the sky can be captured via the optical sensor, and pixel characteristics within the image, such as color, intensity, shape etc. can be used to identify the location of the sun as forming a region of pixels within the image. For example, the control system can implement computer vision and/or object recognition with respect to images captured of the sky to identify the presence of a sun.

Alternatively or additionally, the current solar vector can be identified relative to the reference frame of the vehicle via one or more other sensors, such as solar cells, CDS cells, photodiodes, etc. located on-board the vehicle. These sensors can have a predefined physical arrangement that is known to the control system, enabling the control system to compute a current solar vector based on sensor input from the one or more sensors. For example, the one or more sensors may have different spatial orientations, and the control system may identify the current solar vector based, at least in part, on the relative values of the sensor inputs as these values relate to the solar intensity at the different spatial orientations of the sensors. Furthermore, the solar vehicle may include one or more structures having a predefined physical arrangement configured to induce shadows with respect to these sensors at particular solar vectors, enabling the control system to identify the current solar vector based on shadowing or lack of shadowing of the sensors as represented in the sensor signals input to the control system.

At 326, the method includes determining a steering command for the vehicle during at least a portion of the solar day based, at least in part, on a comparison of the current solar vector to the target solar vector or target solar vector range. This portion of the solar day can correspond to daytime, midday, or other suitable portion of time when the sun is in the sky for the current geographic location of the vehicle. The portion of the solar day may, as examples, include times when the incident solar energy exceeds a threshold value/intensity and/or a period of time beginning at a start time and concluding at an end time that are based on a date and location of the vehicle (e.g., a 4, 6, 8, 10, etc. hour period surrounding noon time).

As an example, the steering command determined at 326 seeks to maintain the current solar vector at the target solar vector or within the target solar vector range during the portion of the solar day while proceeding from the current geographic positioning toward the target geographic destination or intermediate waypoints of a route that includes the target geographic destination. Thus, the steering command determined at 326 may, at times, provide an indirect route from the current geographic positioning toward the target geographic destination or intermediate waypoints. During other periods of the solar day, such as at night, dawn, early morning, early evening, dusk, cloud cover, etc. the steering command may be determined based on the current geographic positioning of the vehicle and the target geographic destination without regard for the target solar vector or target solar vector range. Thus, the steering command determined for these other periods of the solar day can provide a direct route from the current geographic positioning of the vehicle toward the target geographic destination or intermediate waypoints. Depending on the control strategy to be implemented for the vehicle, the steering command can be determined so that the vehicle attains or is within a threshold proximity of each waypoint before moving to a subsequent waypoint in a sequence defined by a route.

At 328, the method includes outputting the steering command determined at 326. In an example, the steering command can be output to the steering system of the vehicle at 330, such as where the vehicle is an autonomous or semi-autonomous vehicle. In another example, the steering command can be output to an output device for a human operator to perceive and use the steering command to steer the vehicle through a user input device located on-board the vehicle or at a remote computing system. Examples of output devices include a graphical display and an audio speaker located on-board the vehicle or at a remote computing system. Where the steering command is determined by a remote computing system at 326, the steering command can be output by the remote computing system and received from the remote computing system by the electronic system of the vehicle over a wired or wireless data link.

At 334, the method includes operating the steering system to steer the vehicle from the current geographic location toward the target geographic destination based on the steering command determined at 326. In the context of an autonomous or semi-autonomous vehicle, the steering system can be operated responsive to the steering command. Within the context of a human operated vehicle, the human operator can provide a user input to the steering system via a user input device to operate the steering system based on the steering command perceived by the user. As previously described with reference to operation 326, the steering command during at least the portion of the solar day is based, at least in part, on a comparison of the current solar vector to the target solar vector. Thus, during this portion of the solar day, the steering system is operated at 336 to steer the vehicle along an indirect path from the current geographic location toward the target geographic destination or intermediate waypoints in an effort to increase or maximize solar energy generated by the one or more photovoltaic solar arrays of the vehicle. From operation 334, method 300 can return to operation 310 or any other operation of method 300, such as to update the steering command responsive to new data obtained by the control system.

Figure 4:
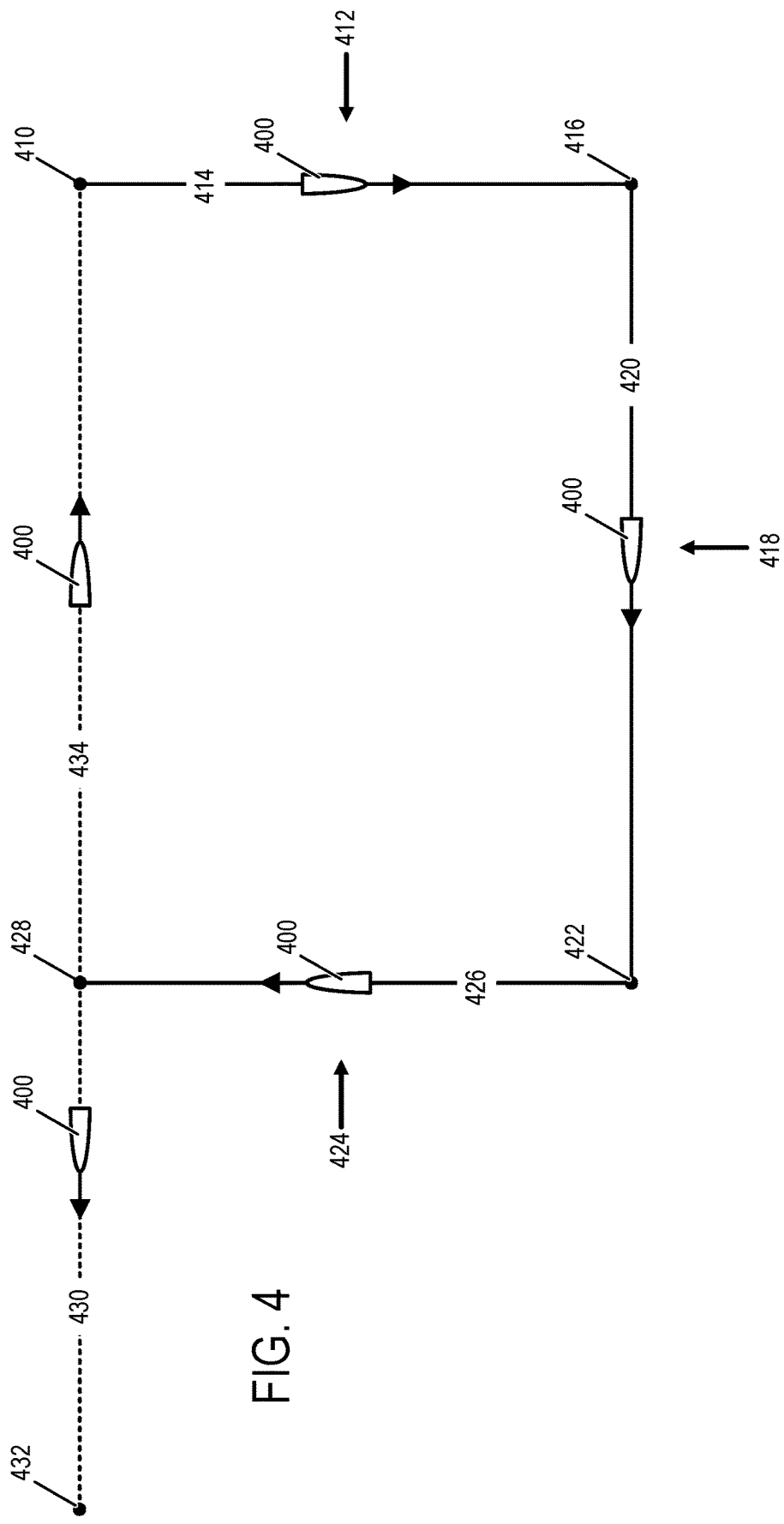
FIG. 4 depicts an example path of travel of a solar vehicle.

FIG. 4 depicts an example of operating a solar vehicle 400 using method 300 of FIG. 3. In this example, solar vehicle 400 begins at geographic location 410 at an earlier period of a solar day when the sun provides a solar vector 412 relative to a reference frame of the vehicle. Responsive to solar vector 412, solar vehicle 400 travels along a path 414 from geographic location 410 to geographic location 416 while maintaining solar vector 412 at a target solar vector or within a target solar vector range for the vehicle. At an intermediate period of the solar day, the sun provides a solar vector 418 relative to the reference frame of the vehicle. Responsive to solar vector 418, solar vehicle 400 travels along a path 420 from geographic location 416 to geographic location 422 while maintaining solar vector 418 at the target solar vector or within the target solar vector range for the vehicle. At a later period of the solar day, the sun provides a solar vector 424 relative to the reference frame of the vehicle. Responsive to solar vector 424, solar vehicle 400 travels along a path 426 from geographic location 422 to geographic location 428 while maintaining solar vector 418 at the target solar vector or within the target solar vector range for the vehicle. Upon reaching geographic location 428, the sun is setting or has set below the horizon, and solar vehicle 400 can travel without regard for the target solar vector or target solar vector range. As an example, solar vehicle 400 travels along a path 430 from geographic location 428 to geographic location 432, representing a target destination for the solar vehicle. As another example, solar vehicle 400 travels along a path 434 from geographic location 428 to return to geographic location 410, thereby completing a holding pattern formed by paths 414, 420, 426, and 434. In each of these examples, solar vehicle 400 is steered along an indirect path to a target geographic destination (e.g., 432 or 410) in a manner that increases a quantity of solar energy generated by one or more photovoltaic solar arrays of the vehicle by reducing or minimizing shading of the solar arrays. While FIG. 4 depicts an example of a holding pattern having a rectangular shape, it will be understood that other suitable holding patterns can be used, including circular, elliptical, figure-eight/bowtie patterns, etc.

As an example, a solar vehicle may follow a bowtie pattern in a station keeping exercise that sets a number of clockwise-turns equal to a number of counter-clockwise turns over a period of time. In the case of a bowtie pattern, as an example shape, a control strategy implemented by the control system may change the orientation of the bowtie pattern (or other shape) throughout the day (e.g., when there is significant direct solar radiation available) to reduce or eliminate shadowing. In this case, a long axis or long dimension of the bowtie pattern can be oriented N-S in the early morning and late afternoon (depending on the configuration data and configuration of the vehicle) to provide reduced shadowing while traveling along the long axis or dimension of the bowtie pattern. Around noon (local time to vehicle), the bowtie pattern can be oriented with the long axis or long dimension in an E-W direction to provide reduced shadowing while traveling along the long axis or dimension of the bowtie pattern. Thus, even though the shape of the holding pattern to be traveled by the vehicle may not be changed throughout the day, the orientation of the shape relative to the earth or other reference frame can be changed progressively throughout the day to reduce or eliminate shadowing. In this example, the target geographic destination can represent a location along a path of the predefined shape traveled by the vehicle, the absolute geographic location of which can change relative to the earth throughout the day as the orientation of the shape is changed depending on the progress of the vehicle along the path. For example, the waypoints and/or target destination defining the shape can be updated throughout the day based on the progress of the vehicle along the path defined by the shape.

Figure 5:
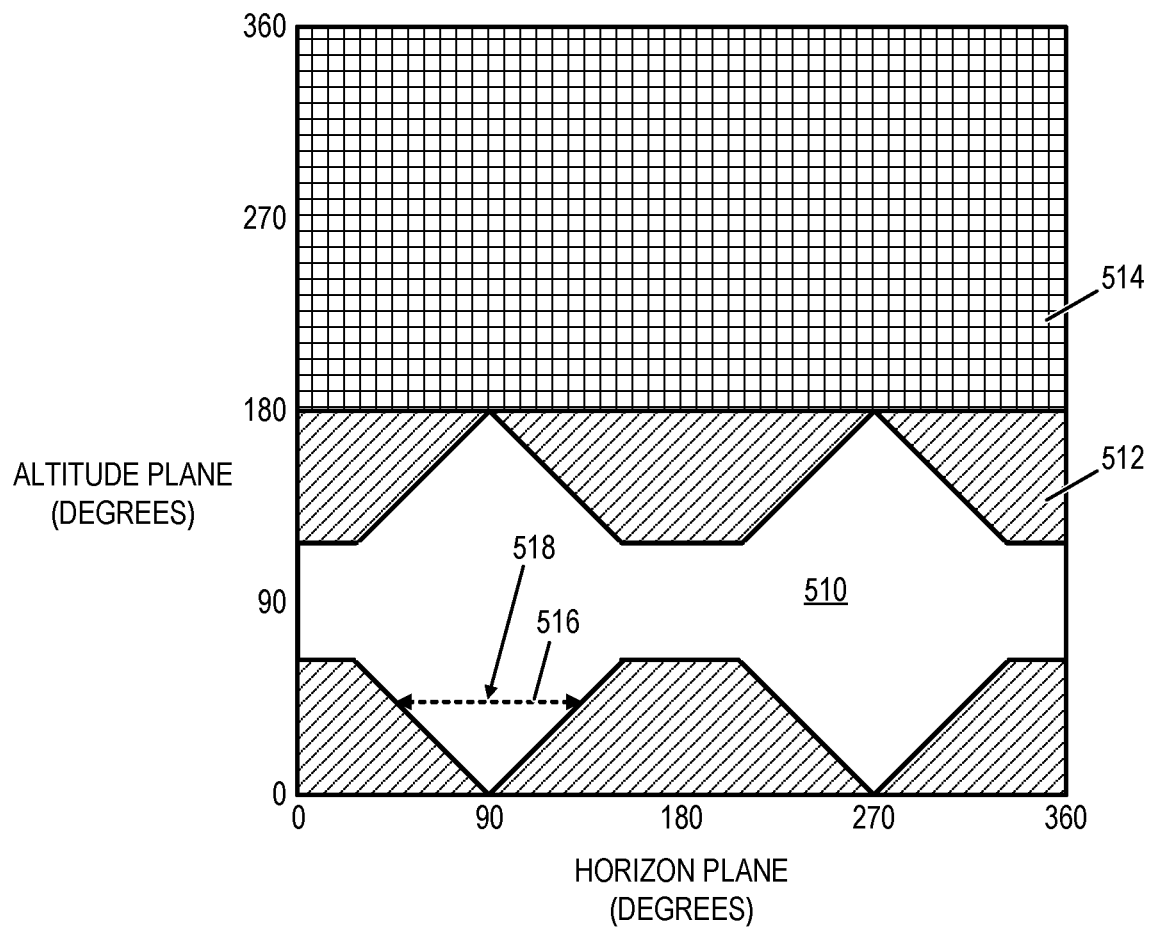
FIG. 5 is a table illustrating an example relationship between solar vectors and shading of a photovoltaic solar array for a solar vehicle.

FIG. 5 is a table 500 illustrating an example relationship between solar vectors and shading of a photovoltaic solar array for a solar vehicle, such as example solar vehicle 100 of FIG. 1. Table 500 provides a 0-360 degrees range of solar vectors relative to a reference frame of the solar vehicle within a horizon plane, and a 0-360 degrees range of solar vectors relative to the reference frame of the solar vehicle within an altitude plane. In this example, 0 degrees in the horizon plane represents the forward longitudinal axis of the solar vehicle, 0 degrees in the altitude plane represents the sun at the horizon plane on a first side of vehicle, 180 degrees in the altitude plane represents the sun at the horizon plane on a second side of the vehicle opposite the first side, and 90 degrees in the altitude plane represents the sun directly above the vehicle.

Table 500 is an example of configuration data that defines a target solar vector or a target solar vector range for the solar vehicle. For example, region 510 of table 500 corresponds to solar vectors in which there is no shading of the solar array by physical components of the vehicle, region 512 of the table corresponds to a shading solar vector range for the vehicle where shading of the solar array occurs, and region 514 corresponds to night time within the solar day. A target solar vector range 516 in the horizon plane (e.g., 50-130 degrees) is depicted in FIG. 5 for a given solar vector relative to the vehicle in the altitude plane (e.g., 45 degrees). By maintaining the vehicle within target solar vector range 516 (e.g., 50-130 degrees) within the horizon plane and/or at a target solar vector 518 (e.g., representing a midpoint of 90 degrees within the target solar vector range), shading of the solar array of the vehicle by physical components of the vehicle can be eliminated. It will be understood that configuration data representing a target solar vector or a target solar vector range can be created for a particular vehicle configuration through modeling or experimentation across a range of solar vectors.

In at least some examples, the methods, operations, and techniques described herein may be tied to a computing system of one or more computing devices. For example, method 300 can be implemented by computing system 260, by remote computing system 292, or by computing system 260 in combination with remote computing system 292. Within FIG. 2, computing system 260 is shown in simplified form as including logic devices, storage devices, and an input/output subsystem. Remote computing system 292 can likewise include logic devices, storage devices, and an input/output subsystem.

A logic device includes one or more physical devices configured to execute instructions. For example, a logic device may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

A logic device may include one or more processors configured to execute software instructions. Additionally or alternatively, a logic device may include one or more hardware or firmware logic machines configured to execute hardware or firmware instructions. Processors of the logic device may be single-core or multi-core, and the instructions executed thereon may be configured for sequential, parallel, and/or distributed processing. Individual components of the logic device optionally may be distributed among two or more separate devices, which may be remotely located and/or configured for coordinated processing.

A data storage device includes one or more physical devices configured to hold instructions and/or other data executable by a logic device to implement the methods or operations described herein. When such methods and operations are implemented, the state of the storage device may be transformed—e.g., to hold different data. A data storage device may include one or more removable and/or built-in devices. A data storage device may include optical memory (e.g., CD, DVD, etc.), semiconductor memory (e.g., RAM, EPROM, EEPROM, etc.), and/or magnetic memory (e.g., hard-disk drive, floppy-disk drive, tape drive, MRAM, etc.), among others. A data storage device may include volatile, nonvolatile, dynamic, static, read/write, read-only, random-access, sequential-access, location-addressable, file-addressable, and/or content-addressable devices. Individual components of the storage device optionally may be distributed among two or more separate devices, which may be remotely located and/or configured for coordinated processing.

Aspects of a logic device and a data storage device may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

An input/output subsystem may comprise or interface with one or more input devices and/or output devices. Examples of input devices include the various sensors described herein, user input devices, communications interfaces (e.g., with another computing device or system), etc. Examples of output devices include any of the controlled devices or systems described herein, as well as output devices that interface with a user or other component.

Examples of the subject matter of the present disclosure are described in the following enumerated paragraphs.

A.1 An autonomous or semi-autonomous solar vehicle comprising: a vehicle body; a steering system mounted to or incorporated within the vehicle body operable to steer the vehicle; and an electronic system mounted to the vehicle body, the electronic system including: one or more photovoltaic solar arrays; a geo-positioning system; and a control system configured to: obtain a target geographic destination for the vehicle: obtain configuration data defining a target solar vector relative to a reference frame of the vehicle; identify a current geographic positioning of the vehicle via the geo-positioning system, including a current geographic location and a current geographic orientation of the vehicle; identify a current solar vector relative to the reference frame of the vehicle; and during at least a portion of a solar day, operate the steering system to steer the vehicle from the current geographic location toward the target geographic destination along an indirect path that is based, at least in part, on a comparison of the current solar vector to the target solar vector.

A.2 The vehicle of paragraph A.1, further comprising one or more physical components mounted to or forming part of the vehicle body that shade at least a portion of the one or more photovoltaic solar arrays within a shading solar vector range; and wherein the target solar vector resides outside of the shading solar vector range.

A.3 The vehicle of paragraph A.2, wherein the one or more physical components include one or more antennas and/or one or more airfoil structures.

A.4 The vehicle of any of paragraphs A.1-A3, wherein the control system is further configured to identify the current solar vector relative to the reference frame of the vehicle based on the current geographic location, the current geographic orientation of the vehicle, a current time of day, and a current date.

A.5 The vehicle of any of paragraphs A.1-A.4, wherein the target solar vector is a target solar vector range defined by the configuration data; and wherein the control system is further configured to operate the steering system by maintaining the current solar vector within the target solar vector range during at least the portion of the solar day.

A.6 The vehicle of any of paragraphs A.1-A.5, wherein the one or more photovoltaic solar arrays are mounted to the vehicle body at a fixed orientation.

A.7 The vehicle of any of paragraphs A.1-A6, further comprising: a propulsion system mounted to the vehicle body operable to propel the vehicle; and wherein the control system is further configured to, during at least the portion of the solar day, operate the propulsion system to propel the vehicle from the current geographic location toward the target geographic destination along the indirect path.

A.8 The vehicle of any of paragraphs A.1-A.7, wherein the indirect path increases a total amount of electrical energy generated by the one or more photovoltaic solar arrays relative to a direct path between the current geographic location and the target geographic destination during at least the portion of the solar day.

A.9 The vehicle of any of paragraphs A.1-A.8, wherein the vehicle is a watercraft and the vehicle body forms a hull.

A.10. The vehicle of any of paragraphs A.1-A.8, wherein the vehicle is an aeronautical vehicle or a land vehicle.

A.11. The vehicle of any of paragraphs A.1-A.10, wherein the target geographic destination is one of a plurality of waypoints along a predefined route.

A.12 The vehicle of any of paragraphs A.1-A.11, wherein the control system obtains the target geographic destination over a wired or wireless communications link from a remote computing system; wherein the control system includes a data storage device having the configuration data stored thereon; and wherein the control system obtains the configuration data by retrieving the configuration data from the data storage device.

A.13 The vehicle of any of paragraphs A.1-A.12, wherein the configuration data is one of a plurality of configuration data sets stored on the data storage device, each configuration data set being associated with a respective configuration identifier; and wherein the control system is further configured to: receive a configuration identifier over a wired or wireless data link from a remote computing system, and wherein the configuration data retrieved from the data storage device is identified among the plurality of configuration data sets as being associated with the configuration identifier received from the remote computing system.

A.14 The vehicle of any of paragraphs A.1-A.13, wherein the control system is configured to identify the current solar vector relative to the reference frame of the vehicle via an optical sensor residing on-board the vehicle.

B.1 A computing system, comprising: a data storage device having instructions stored thereon executable by one or more computing devices to: obtain a target geographic destination for a vehicle having one or more photovoltaic solar arrays; obtain configuration data defining a target solar vector relative to a reference frame of the vehicle; identify a current geographic positioning of the vehicle via a geo-positioning system of the vehicle, including a current geographic location and a current geographic orientation of the vehicle; identify a current solar vector relative to the reference frame of the vehicle; and during at least a portion of a solar day, output a steering command for the vehicle for an indirect path from the current geographic location toward the target geographic destination that is based, at least in part, on a comparison of the current solar vector to the target solar vector.

B.2 The computing system of paragraph B.1, wherein the vehicle includes one or more physical components mounted to or forming part of the vehicle body that shade at least a portion of the one or more photovoltaic solar arrays within a shading solar vector range, and wherein the target solar vector resides outside of the shading solar vector range; wherein the target solar vector is a target solar vector range that differs from the shading solar vector range; and wherein the instructions are further executable by the one or more computing devices to output the steering command to maintain the current solar vector within the target solar vector range during at least the portion of the solar day.

B.3 The computing system of any of paragraphs B.1-B.2, wherein the indirect path increases a total amount of electrical energy generated by the one or more photovoltaic solar arrays relative to a direct path between the current geographic location and the target geographic destination during at least the portion of the solar day.

C.1 A method performed by a computing system of one or more computing devices, the method comprising: obtaining a target geographic destination for a vehicle having one or more photovoltaic solar arrays; obtaining configuration data defining a target solar vector relative to a reference frame of the vehicle; identifying a current geographic positioning of the vehicle via a geo-positioning system of the vehicle, including a current geographic location and a current geographic orientation of the vehicle; identifying a current solar vector relative to the reference frame of the vehicle; and during at least a portion of a solar day, outputting a steering command for the vehicle for an indirect path from the current geographic location toward the target geographic destination that is based, at least in part, on a comparison of the current solar vector to the target solar vector.

C.2 The method of paragraph C.1, wherein the vehicle includes one or more physical components mounted to or forming part of the vehicle body that shade at least a portion of the one or more photovoltaic solar arrays within a shading solar vector range, and wherein the target solar vector resides outside of the shading solar vector range; wherein the target solar vector defines a target solar vector range that differs from the shading solar vector range; and wherein the method further comprises outputting the steering command to maintain the current solar vector within the target solar vector range during at least the portion of the solar day.

C.3 The method of any of paragraphs C.1-C.2, wherein the indirect path increases a total amount of electrical energy generated by the one or more photovoltaic solar arrays relative to a direct path between the current geographic location and the target geographic destination during at least the portion of the solar day.

It will be understood that the configurations and/or techniques described herein are exemplary in nature, and that these specific examples are not to be considered in a limiting sense, because numerous variations are possible. The specific methods and operations described herein may represent one or more of any number of processing strategies. As such, various acts illustrated and/or described may be performed in the sequence illustrated and/or described, in other sequences, in parallel, or omitted. Likewise, the order of the above-described operations may be changed, depending on implementation. The subject matter of the present disclosure includes all novel and non-obvious combinations and sub-combinations of the various configurations and techniques, and other features, functions, acts, and/or properties disclosed herein, as well as any and all equivalents thereof.

The invention claimed is:

1. An autonomous or semi-autonomous solar watercraft, comprising:
    a vehicle body forming a hull;
    a steering system mounted to or incorporated within the vehicle body operable to steer the watercraft; and
    an electronic system mounted to the vehicle body, the electronic system including:
        one or more photovoltaic solar arrays;
        a geo-positioning system; and
        a control system configured to:

obtain a target geographic destination for the watercraft;

obtain configuration data defining a target solar vector relative to a reference frame of the watercraft;

identify a current geographic positioning of the watercraft via the geo-positioning system, including a current geographic location and a current geographic orientation of the watercraft;

identify a current solar vector relative to the reference frame of the watercraft; and during at least a portion of a solar day, operate the steering system to steer the watercraft from the current geographic location toward the target geographic destination along an indirect path that is based, at least in part, on a comparison of the current solar vector to the target solar vector.

2. The watercraft of claim 1, further comprising one or more physical components mounted to or forming part of the vehicle body that shade at least a portion of the one or more photovoltaic solar arrays within a shading solar vector range; and wherein the target solar vector resides outside of the shading solar vector range.

3. The watercraft of claim 2, wherein the one or more physical components include one or more antennas and/or one or more airfoil structures.

4. The watercraft of claim 1, wherein the control system is further configured to identify the current solar vector relative to the reference frame of the watercraft based on the current geographic location, the current geographic orientation of the watercraft, a current time of day, and a current date.

5. The watercraft of claim 1, wherein the target solar vector is a target solar vector range defined by the configuration data; and wherein the control system is further configured to operate the steering system by maintaining the current solar vector within the target solar vector range during at least the portion of the solar day.

6. The watercraft of claim 1, wherein the one or more photovoltaic solar arrays are mounted to the vehicle body at a fixed orientation.

7. The watercraft of claim 4, further comprising:

a propulsion system mounted to the vehicle body operable to propel the watercraft; and wherein the control system is further configured to, during at least the portion of the solar day, operate the propulsion system to propel the watercraft from the current geographic location toward the target geographic destination along the indirect path.

8. The watercraft of claim 1, wherein the indirect path increases a total amount of electrical energy generated by the one or more photovoltaic solar arrays relative to a direct path between the current geographic location and the target geographic destination during at least the portion of the solar day.

9. The watercraft of claim 1, wherein the target geographic destination is one of a plurality of waypoints along a predefined route.

10. The watercraft of claim 1, wherein the control system obtains the target geographic destination over a wired or wireless communications link from a remote computing system;

wherein the control system includes a data storage device having the configuration data stored thereon; and wherein the control system obtains the configuration data by retrieving the configuration data from the data storage device.

11. The watercraft of claim 10, wherein the configuration data is one of a plurality of configuration data sets stored on the data storage device, each configuration data set being associated with a respective configuration identifier; and wherein the control system is further configured to:

receive a configuration identifier over a wired or wireless data link from a remote computing system, and wherein the configuration data retrieved from the data storage device is identified among the plurality of configuration data sets as being associated with the configuration identifier received from the remote computing system.

12. The watercraft of claim 1, wherein the control system is configured to identify the current solar vector relative to the reference frame of the watercraft via an optical sensor residing on-board the watercraft.

13. An autonomous or semi-autonomous solar vehicle, comprising:

a vehicle body;

a steering system mounted to or incorporated within the vehicle body operable to steer the vehicle;

a propulsion system mounted to the vehicle body operable to propel the vehicle; and an electronic system mounted to the vehicle body, the electronic system including:

one or more photovoltaic solar arrays;

a geo-positioning system;

one or more physical components mounted to or forming part of the vehicle body that shade at least a portion of the one or more photovoltaic solar arrays within a shading solar vector range; and a control system configured to:

obtain a target geographic destination for the vehicle;

obtain configuration data defining a target solar vector range relative to a reference frame of the vehicle, wherein the target solar vector resides outside of the shading solar vector range;

identify a current geographic positioning of the vehicle via the geo-positioning system, including a current geographic location and a current geographic orientation of the vehicle;

identify a current solar vector relative to the reference frame of the vehicle;

during at least a portion of a solar day, operate the steering system to steer the vehicle from the current geographic location toward the target geographic destination along an indirect path that is based, at least in part, on a comparison of the current solar vector to the target solar vector range by maintaining the current solar vector within the target solar vector range during at least the portion of the solar day; and during at least the portion of the solar day, operate the propulsion system to propel the vehicle from the current geographic location toward the target geographic destination along the indirect path.

14. The vehicle of claim 13, wherein the vehicle is a watercraft and the vehicle body forms a hull.

15. The vehicle of claim 13, wherein the one or more physical components include one or more antennas and/or one or more airfoil structures.

16. The vehicle of claim 13, wherein the vehicle is an aeronautical vehicle.

17. The vehicle of claim 13, wherein the vehicle is a land vehicle.

18. The vehicle of claim 13, wherein the one or more photovoltaic solar arrays are mounted to the vehicle body at a fixed orientation.

19. An autonomous or semi-autonomous solar watercraft, comprising:
- a vehicle body forming a hull;
- a steering system mounted to or incorporated within the vehicle body operable to steer the watercraft;
- a propulsion system mounted to the vehicle body operable to propel the watercraft; and
- an electronic system mounted to the vehicle body, the electronic system including:
  - one or more photovoltaic solar arrays;
  - a geo-positioning system; and
  - a control system configured to:
    - obtain a target geographic destination for the watercraft;
    - obtain configuration data defining a target solar vector relative to a reference frame of the watercraft;
    - identify a current geographic positioning of the watercraft via the geo-positioning system, including a current geographic location and a current geographic orientation of the watercraft;
    - identify a current solar vector relative to the reference frame of the watercraft;
    - during at least a portion of a solar day, operate the steering system to steer the watercraft from the current geographic location toward the target geographic destination along an indirect path that is based, at least in part, on a comparison of the current solar vector to the target solar vector; and
    - during at least the portion of the solar day, operate the propulsion system to propel the watercraft from the current geographic location toward the target geographic destination along the indirect path.

20. The watercraft of claim 19, further comprising one or more physical components mounted to or forming part of the vehicle body that shade at least a portion of the one or more photovoltaic solar arrays within a shading solar vector range; and
wherein the target solar vector resides outside of the shading solar vector range.

* * * * *